United States Patent [19]

Woods et al.

[11] 4,269,740

[45] May 26, 1981

[54] PROCESS FOR PRODUCING ELASTOMERIC PARTICLES FREE OF AGGLOMERATION

[75] Inventors: Martin E. Woods, Concord Township, Lake County; Daniel M. Chang, Avon Lake, both of Ohio

[73] Assignee: The B. F. Goodrich Company, Akron, Ohio

[21] Appl. No.: 79,752

[22] Filed: Sep. 28, 1979

[51] Int. Cl.$^3$ .......................... C08L 7/00; C08L 9/00; C08L 11/00
[52] U.S. Cl. .............................. 260/4 R; 260/29.6 RB; 260/30.6 R; 260/31.8 M; 525/197; 525/198; 525/215; 525/239
[58] Field of Search .......... 260/4 R, 29.6 RB, 30.6 R, 260/31.8 M; 525/197, 198, 239, 215

[56] References Cited

U.S. PATENT DOCUMENTS

| | | | |
|---|---|---|---|
| 2,870,115 | 1/1959 | Schroeder | 260/45.5 |
| 3,145,189 | 8/1964 | Fourier | 260/45.5 |
| 3,513,227 | 5/1970 | De Coene et al. | 260/887 |
| 4,194,999 | 3/1980 | Hayashi et al. | 260/17 R |

*Primary Examiner*—Earl A. Nielsen
*Attorney, Agent, or Firm*—Roy P. Wymbs

[57] ABSTRACT

This invention relates to a process of producing elastomeric particles, such as those of natural and synthetic powdered and crumb rubbers and to the compositions prepared in accordance with such process. Specifically, the invention comprises encapsulating the elastomeric particles with a coating or film of a preplasticized vinyl resin, such as, for example, polymers and copolymers of vinyl and vinylidene halides and the like. The resultant composite particles are free-flowing and free of irreversible agglomeration and can be used in dry-blending with other materials prior to being formed into useful articles.

15 Claims, No Drawings

PROCESS FOR PRODUCING ELASTOMERIC PARTICLES FREE OF AGGLOMERATION

CROSS REFERENCE TO RELATED APPLICATION

A related application for U.S. Patent is Ser. No. 944,681, filed Sept. 22, 1978, in the name of Daniel Ming Chang.

BACKGROUND OF THE INVENTION

It is well known and accepted in the art that the transport and industrial utilization of elastomers in the form of small particles, such as powders, large particles or crumbs or granules, are particularly convenient for ease of handling and use in the manufacture of many end products, either alone or in combination with other materials. Unfortunately, these elastomeric particles present a great difficulty in that they tend to agglomerate irreversibly during industrial transformation operations and during transport or storage of the elastomeric particles. This agglomeration makes the product most undesirable for use in all or most commercial operations.

In order to overcome these agglomerations, it has been the practice to use flow control agents in the processing, dispensing and storage of elastomeric particulate materials, which agents can physically separate larger particles thereby preventing their agglomeration. By flow control agents is meant organic or mineral powders or dusts, such as talc, which separate the elastomeric particles from one another. However, elastomeric particles, such as powdered and crumb rubbers, are very prone to agglomeration during storage, even when such material is treated with flow control agents, such as talc. This is so, since it has been found that the additive employed to separate the elastomer particles is itself in the form of fine powder, for example, talc, and thus separates from the larger elastomer particles and gives a final non-homogeneous and powdery product. As a result, this powdery product cannot be adequately and economically handled in the usual commercial handling equipment, such as molding apparatus, and the like. In addition, the final product may be heterogeneous and the foundation of dust associated therewith presents risks for the health of the operators of the equipment.

It has also been proposed, in order to overcome the problem of agglomeration, to apply a resin coating to the elastomeric particles. Here again, such techniques have met with difficulties since, in many instances, the resin which covered the particles had a tendency to be separated from the elastomeric particles. The resin collects in the bottom of the storage container and is designated by the term "fines". The presence of fines causes the elastomeric particles to again agglomerate and when the product is worked, or employed on commercial finishing equipment, the fines result in a heterogeneous product which is unacceptable. This modification of the elastomer particles by coating with a resin is commonly known as "encapsulation" and care must be taken so as not to adversely affect or alter the processing characteristics of the elastomer. On the other hand, if one could find the proper encapsulating material, which is compatible with the end use characteristics of the elastomer and does not substantially modify its intrinsic properties, it would greatly enhance the usefulness of elastomers or free flowing powdered and crumb rubbers.

SUMMARY OF THE INVENTION

It has unexpectedly been found that preplasticized vinyl resins can be employed to encapsulate or coat elastomers or elastomeric particles, such as those of natural and synthetic powdered and crumb rubbers, whereby said particles are rendered free flowing and free of irreversible agglomeration upon storage, shipping and handling. These so-treated elastomers can be used alone or in blends with other materials in making shaped and useful articles. The process of the present invention involves making a dispersion of the elastomer or elastomeric particles and combining the same with a latex or emulsion of the preplasticized vinyl resin or non-elastomeric particles. The combined system or mixture is then coagulated with conventional coagulants which result in the deposition of the nonelastomeric particles on the elastomeric particles thus coating or encapsulating the same. The mixture is then filtered and the free flowing encapsulated elastomer is recovered and dried.

DETAILED DESCRIPTION

In the present invention the term "vinyl resin" is employed. This term refers to and encompasses polymers and copolymers of vinyl and vinylidene halides, such as vinyl chloride, vinylidene chloride, and the like. In addition to the homopolymers, the vinyl halides and vinylidene halides may be copolymerized with each other or either may be copolymerized with one or more vinylidene monomers having at least one terminal $CH_2=C<$ grouping. As examples of such vinylidene monomers, there may be mentioned the $\alpha,\beta$-olefinically unsaturated carboxylic acids, such as acrylic acid, methacrylic acid, ethacrylic acid, $\alpha$chloroacrylic acid, $\alpha$-cyanoacrylic acid, and the like; esters of acrylic acid, such as methyl acrylate, ethyl acrylate, butyl acrylate, octyl acrylate, cyano-ethyl acrylate, and the like; esters of methacrylic acid, such as methyl methacrylate, butyl methacrylate, and the like; nitriles, such as acrylonitrile and methacrylonitrile; acrylamide, such as methyl acrylamide, N-methylol acrylamide, N-butoxy methacrylamide, and the like; vinyl ethers, such as ethyl vinyl ether, chloroethyl vinyl ether, and the like; the vinyl ketones; styrene and styrene derivatives including $\alpha$-methyl styrene, vinyl toluene, chlorostyrene, and the like; vinyl naphthalene, allyl and vinyl chloroacetate, vinyl acetate, vinyl pyridine, methyl vinyl ketone; diolefins, including butadiene, isoprene, chloroprene, and the like; and mixtures of any of these types of monomers and other vinylidene monomers copolymerizable therewith including esters of maleic and fumaric acid, and the like; and other vinylidene monomers of the types known to those skilled in the art.

The vinyl resins for use herein are made by use of the emulsion polymerization process and more particularly, the monomer(s) are polymerized in the presence of a suitable plasticizer therefor. When making the copolymers of vinyl or vinylidene halides, one or more vinylidene monomers copolymerizable therewith are employed in amounts as great as about 80% by weight, based on the weight of the monomer mixture. The most preferred vinyl resin is polyvinyl chloride (PVC) and the present invention, for simplicity and convenience will be described in connection therewith, it being understood that this is merely intended in an illustrative sense and not limitative.

As has been previously pointed out, the vinyl resins of the present invention are prepared in the presence of a plasticizer using an emulsion polymerization technique in an aqueous medium. The plasticizer must be one suitable for the particular vinyl resin or polymer being prepared. Such plasticizer must also be one which is compatible with the elastomers or elastomeric particles to be encapsulated or coated with the vinyl resin. The process of preparing vinyl resins or polymers in the presence of a plasticizer is referred to as "plastimerization" and for the purposes of the present invention, a plastimerized vinyl resin will suffice for producing the free flowing and non-agglomerating powder and crumb rubbers or elastomeric particles. However, merely preparing vinyl resins by polymerizing in the presence of a plasticizer is not enough. Certain important steps must be followed in order to obtain a vinyl resin suitable for use in the present invention. In order to obtain the proper vinyl resin, the procedure described in U.S. Pat. No. 3,867,331, issued Feb. 18, 1975, is satisfactory and such patent is incorporated herein and made a part hereof.

Among the plasticizers that may be used in making the vinyl resins for use herein are the organic phosphoric esters, such as tricresyl phosphate, triphenyl phosphate, isodecyl diphenyl phosphate, tributoxy ethyl phosphate, and the like; phthalic esters, such as dioctyl phthalate, dimethyl phthalate, dibutyl phthalate, dilauryl phthalate, dimethyl tetrachlorophthalate, butyl phthalyl butyl glycollate, and the like. In fact, any known plasticizer for vinyl resins may be employed in the polymerization reaction. For the purposes proposed for the instant invention, it has been found that from about 5 parts to about 150 parts by weight of plasticizer, based on the weight of the monomer or monomers being polymerized can be charged as a polymerization ingredient. Usually an amount of plasticizer in the range of about 50 parts to about 100 parts by weight is sufficient. It is possible, in certain instances, to use larger amounts of plasticizer than that set out above, keeping in mind the limitations as defined in U.S. Pat. No. 3,867,331.

In addition to natural rubber, the present invention is applicable to the encapsulation of various elastomers in powdered and crumb form. For example, there may be named the vinyl acetate-ethylene copolymers which contain from about 45% to about 95% by weight of vinyl acetate; polybutadienes; copolymers or butadiene with one or more polymerizable ethylenically unsaturated monomers, such as, for example, styrene, acrylonitrile, methyl methacrylate, and the like; polymers of substituted butadienes such as isoprene, for example, polyisoprene, and chlorobutadienes, for example, neoprene; and the like. These elastomers are obtainable in the form of aqueous latices or dispersions and may be recovered therefrom as a crumb (crumb rubbers) by standard coagulation procedures, that is, by the addition thereto with agitation of a coagulating agent, for example, calcium chloride. The elastomers are also available in bulk form and are made suitable for use in the practice of the present invention by grinding the same into fine powders. Thereafter the powders are dispersed in a suitable aqueous medium by the usual methods, such as by high speed agitation or homogenization. In most instances, water is the most suitable medium for forming the dispersions.

The particle size of the crumbs and the ground powder of the elastomers will vary in accordance with the end use for which they are designed. In general, the particle size of the elastomeric crumbs and ground powder will be in the range of about 100 microns to about 6,000 microns; although very satisfactory results are obtained with a particle size in the range of about 500 to about 6,000 microns. These size ranges include the elastomer plus the encapsulating preplasticized vinyl resin. It should be pointed out, however, that said vinyl resin constitutes a very small percentage of the finished free-flowing elastomeric material. In fact, the amount of the encapsulating vinyl resin employed to achieve the desired result will vary from about 3% to about 15% by weight based on the weight of the elastomer. Satisfactory results are obtained when the vinyl resin is in the range of about 4% to about 8% by weight based on the weight of the elastomer.

In the practice of the encapsulation process of the instant invention, the elastomeric material is first dispersed in an aqueous medium, preferably water alone, with agitation or mixing. Depending upon the particular elastomer being dispersed, the temperature employed will be in the range of about 25° C. to about 75° C. However, it has been found that, in most instances, mixing at room temperature is sufficient. The solids content of the resultant elastomer dispersion or slurry will be in range of about 15% to about 40% by weight. It is noted, however, that for ease of handling, in subsequent steps, a total solids content in the slurry of about 25% by weight is most desirable.

As pointed out hereinbefore, the encapsulating plastimerized vinyl resin or polymer is prepared in the form of a latex using the emulsion polymerization technique, that is, polymerizing the monomer(s) in an aqueous medium in the presence of an emulsifying agent or agents, a plasticizer and a free radical yielding initiator or catalyst. The preplasticized vinyl resin is thus prepared in the form of a latex or stable emulsion of polymer in the aqueous medium with a polymer particle size generally in the range of about 0.2 to about 15 microns with most of the particles being less than about 2 microns in size. It is necessary to stay within this range of particle size in order to form a stable emulsion, since it should be noted that the particle size increases as the amount of plasticizer employed in the polymerization medium increases. The usual polymerization medium for making the vinyl resin latex is water, as is the case of forming the dispersion of the elastomeric material. The aqueous medium used in the emulsion polymerization system for making the preplasticized vinyl resin and the medium used in the dispersal of the elastomer should be the same or at least readily miscible with one another.

After preparation of the preplasticized vinyl resin latex, the solids content of the same is adjusted so as to have the proper amount for encapsulation of the particles in the elastomer slurry. The solids content of the latex is adjusted by the addition of water thereto with stirring. Usually a solids content in the range of about 20% to about 60% by weight is satisfactory. After said solids content adjustment, the latex is poured into the slurry while agitating the same. This agitation is continued throughout the subsequent coagulation and encapsulation step. In the combined elastomer slurry and vinyl resin latex the preplasticized vinyl resin will constitute about 2% to about 20% by weight of the total solids content. Preferably, the vinyl resin will be present in an amount of about 6% to about 12% by weight of the total solids content.

In order to encapsulate the elastomeric particles, there is added to the combined slurry or dispersion of elastomer and vinyl resin latex a coagulating agent for the preplasticized vinyl resin, such as calcium chloride, for example. The coagulating agent is added in a dilute aqueous solution containing about 2.0% to about 10.0% by weight of said agent. Preferably, the concentration of the coagulating agent will be in the range of about 3.0% to about 6.0% by weight. Any of the known coagulating agents may be used and the choice thereof very often depends on the type of surfactant employed in making the preplasticized vinyl resin latex. In addition to $CaCl_2$, as examples of the known coagulating agents there may be named $Al_2(SO_4)_3$, $MgSO_4$, $CaO$, $Ba(OH)_2$, and the like.

The addition of the coagulant solution to the combined slurry-latex is important in that it must be done slowly so that the coagulation is produced slowly. If the coagulation is produced too rapidly, the coagulated vinyl resin particles form a separate phase and do not form the coating on the elastomeric particles desired. As pointed out before, the slurry or dispersion is agitated during the addition of the coagulant solution and continued for a period thereafter in the range of about 15 minutes to about 90 minutes. The temperature of the slurry or dispersion should be close to or higher than the agglomeration temperature of the particular preplasticized vinyl resin latex being employed. However, the temperature should be lower than the decomposition temperature of the vinyl resin being used. The agglomeration temperature, referred to above, is the temperature at which the fine or small particles of the vinyl resin dispersed in the aqueous medium, or water, melt and collect to aggregates of larger size. In general, a temperature in the range of about 25° C. to about 95° C. is satisfactory when adding the coagulant solution to the slurry or dispersion, it being understood that the agglomeration temperature of the preplasticized vinyl resin depends on a number of properties of the polymer, such as, for example, the chemical nature of the vinyl resin, the molecular weight of the resin, molecular weight distribution, etc. Inasmuch as there are many variations in the properties of the different preplasticized vinyl resins, it is preferred to determine the agglomeration temperature on representative samples of each type of resin and to determine from that the coagulating or coating temperature for each individual vinyl resin.

As the coagulation agent is added slowly to the elastomer-vinyl resin latex slurry or dispersion, the coagulation proceeds slowly with the simultaneous precipitation or deposition of the vinyl resin on the surface of the elastomer particles. This results in a coating over the particles, or encapsulation thereof, which coating is substantially complete in the case of most all of the particles. All of the other particles have sufficient vinyl resin coating thereon to achieve the desired results of the invention, namely, to prevent caking of the particles and make the same free-flowing.

After the coagulation or encapsulation step the slurry or dispersion is filtered, or otherwise treated, to separate the preplasticized vinyl resin encapsulated rubber or elastomer particles from the liquid phase or medium. Thereafter the particles are dried by any convenient means, such as a hot air dryer. Usually a temperature in the range of about 100° C. to about 150° C. is sufficient to adequately dry the encapsulated particles. In many cases, after drying, there may be some very fine particles of vinyl resin present. However, these can be separated by conventional means, such as screening, for example.

The effect of the plasticizer in the vinyl resin particles is to soften the same and give them the film forming property. This enables one to encapsulate the rubber or elastomer particles so successfully. The preplasticized vinyl resin latex wets the rubber or elastomer particles, that is, some of the plasticizer diffuses into the elastomer particles. With a proper selection of plasticizer level, as pointed out hereinbefore, the Tg (glass transition temperature) of the vinyl resin is reduced to a point where the vinyl resin is film forming at the drying temperature. Further, with the small amount of diffusion of the plasticizer into the elastomer or rubber, the Tg of the vinyl resin film is increased so that it behaves like a rigid material at room temperature. The properties of the elastomer are not significantly affected due to the small amount of preplasticized vinyl resin employed in the encapsulation. Any property changes are of such a minor nature and such changes can be readily compensated for by adjusting the recipe and/or the processing procedures when utilizing the resultant encapsulated product of the present invention.

To further illustrate the present invention, the following specific example is given, it being understood that this is merely intented in an illustrative and not a limitative sense. In the example, all parts and percents are by weight unless otherwise indicated.

EXAMPLE I

In this example the elastomer particles employed were a copolymer of 32% acrylonitrile and 68% butadiene having an average particle size of 1 mm. in diameter. These particles were encapsulated with a polyvinyl chloride polymer (PVC) prepared in the presence of dioctyl phthalate as plasticizer to give a polymer latex, the polymer particles of which contained 35 parts of said plasticizer. The procedure for encapsulation was as follows: a suspension of the elastomeric particles in water was made with agitation to give 20% elastomer and heated to 90° C. The PVC latex, 90° C. containing 56% PVC was slowly added to the agitated 56% elastomer suspension. Then a 5% calcium chloride solution was added dropwise to the mixture at 90° C. Thereafter, the agitation was continued for one hour at 90° C. and then cooled to room temperature. The encapsulated crumbs of elastomer were filtered off and dried. There was a little PVC fines at the bottom of the mixing vessel. The resultant dried elastomer or rubber particles or crumbs were substantially coated or encapsulated with the plasticized PVC and were not agglomerated.

One of the most important advantages of the present invention is that it provides a simple method of preparing particles of powdered and crumb rubbers or elastomers which are free flowing and free of irreversible agglomeration. Further, the encapsulated elastomer particles of the invention are conveniently and readily usable in dry blending with other materials prior to being formed or shaped into various commercial articles. Numerous other advantages of the present invention will be readily apparent to those skilled in the art.

While the present invention has been described in terms of its specific embodiments, certain modifications and equivalents will be apparent to those skilled in the art and are intended to be included within the scope of the present invention, which is to be limited only by the reasonable scope of the appended claims.

I claim:

1. The process of producing elastomer particles in the form of dry, non-agglomerating powders or crumbs which comprises, forming a dispersion of elastomer particles in an aqueous medium containing from about 15% to about 40% by weight of total solids, adding thereto with agitation an aqueous dispersion of a preplasticized resin latex containing from about 20% to about 60% by weight of total solids, said resin being selected from preplasticized homopolymers and copolymers of vinyl and vinylidene halides, adding to the combined dispersions a coagulating agent in an aqueous medium with agitation whereby said resin is precipitated in the form of a film on said elastomer particles thereby encapsulating said particles with said resin, continuing the agitation for a period of about 15 to about 90 minutes, and then separating the encapsulated particles from the aqueous medium and drying the same, said dried encapsulated particles being such that they do not irreversibly agglomerate upon storage.

2. The process as defined in claim 1 wherein the vinyl resin is polyvinyl chloride.

3. The process as defined in claim 1 wherein the vinyl resin is a copolymer of vinyl chloride and vinyl acetate.

4. The process as defined in claim 1 wherein the elastomer is natural rubber.

5. The process as defined in claim 1 wherein the elastomer is a copolymer of styrene and butadiene.

6. The process as defined in claim 1 wherein the elastomer is a copolymer of acrylonitrile, butadiene, and styrene.

7. The process as defined in claim 1 wherein the elastomer is neoprene.

8. The process as defined in claim 1 wherein the preplasticized vinyl resin is made by polymerizing vinyl chloride in the presence of a plasticizer selected from organic phosphoric esters and phthalic esters.

9. The process as defined in claim 8 wherein the plasticizer is dioctyl phthalate.

10. The process as defined in claim 1 wherein the coagulating agent is an aqueous solution containing from about 2.0% to about 10.0% by weight of calcium chloride.

11. The process as defined in claim 10 wherein the vinyl resin is polyvinyl chloride.

12. The process as defined in claim 11 wherein the elastomer is a copolymer of butadiene and acrylonitrile.

13. The process as defined in claim 12 wherein the polyvinyl chloride is made by polymerizing vinyl chloride in the presence of a plasticizer selected from organic phosphoric esters and phthalic esters.

14. The process as defined in claim 13 wherein the plasticizer is dioctyl phthalate.

15. The process as defined in claim 1 wherein the elastomer is a copolymer of butadiene and acrylonitrile.

* * * * *